US012673852B2

(12) United States Patent
Mang et al.

(10) Patent No.: US 12,673,852 B2
(45) Date of Patent: Jul. 7, 2026

(54) MOBILE CRANE

(71) Applicant: Liebherr-Werk Ehingen GmbH, Ehingen (DE)

(72) Inventors: Philipp Mang, Ehingen (DE); Jörg Gebele, Ulm (DE); Michael Engst, Ehingen (DE); Klaus-Peter Brück, Ehingen (DE)

(73) Assignee: LIEBHERR-WERK EHINGEN GMBH, Ehingen (DE)

( * ) Notice: Subject to any disclaimer, the term of this patent is extended or adjusted under 35 U.S.C. 154(b) by 57 days.

(21) Appl. No.: 18/756,802

(22) Filed: Jun. 27, 2024

(65) Prior Publication Data

US 2025/0002301 A1 Jan. 2, 2025

(30) Foreign Application Priority Data

Jun. 27, 2023 (DE) .................... 10 2023 116 860.6

(51) Int. Cl.
*B66C 13/06* (2006.01)
*B66C 13/50* (2006.01)
*B66C 23/42* (2006.01)

(52) U.S. Cl.
CPC ............ *B66C 13/066* (2013.01); *B66C 13/50* (2013.01); *B66C 23/42* (2013.01)

(58) Field of Classification Search
CPC .......... F15B 2211/30515; F15B 11/003; F15B 13/01; B66C 13/50; B66C 13/066
See application file for complete search history.

(56) References Cited

U.S. PATENT DOCUMENTS

| | | | | | |
|---|---|---|---|---|---|
| 7,383,682 | B2 | 6/2008 | Kauss | | |
| 2007/0059146 | A1* | 3/2007 | Bitter | .................... | E02F 9/2207 414/685 |
| 2008/0152513 | A1* | 6/2008 | Esders | ...................... | B66F 9/24 417/411 |
| 2023/0279877 | A1* | 9/2023 | Lowman | ............... | F15B 13/024 60/413 |

FOREIGN PATENT DOCUMENTS

| | | | |
|---|---|---|---|
| DE | 10354959 | A1 | 6/2005 |
| EP | 0482248 | A1 | 4/1992 |

* cited by examiner

*Primary Examiner* — Nathaniel E Wiehe
*Assistant Examiner* — Daniel S Collins
(74) *Attorney, Agent, or Firm* — McCoy Russell LLP

(57) ABSTRACT

The disclosure relates to a mobile crane, in particular an rough terrain crane, comprising a boom mounted so as to be pivotable about a horizontal pivot axis, a hydraulic luffing cylinder by means of which the boom can be luffed up and down about the pivot axis, a hydraulic control block for controlling the luffing cylinder and a first safety valve which is connected between the control block and the luffing cylinder and is configured to seal off a load-bearing cylinder chamber of the luffing cylinder in a blocking position. According to the disclosure, the crane further comprises a second safety valve, which is connected in series between the first safety valve and the control block and is configured to seal off the load-bearing cylinder chamber of the luffing cylinder in a blocking position.

19 Claims, 3 Drawing Sheets

MOBILE CRANE

CROSS REFERENCE TO RELATED APPLICATION

The present application claims priority to German Patent Application No. 10 2023 116 860.6 filed on Jun. 27, 2023. The entire contents of the above-listed application are hereby incorporated by reference for all purposes.

TECHNICAL FIELD

The present disclosure relates to a mobile crane.

BACKGROUND

Mobile cranes with wheeled chassis are known from the prior art. Such mobile construction machines have a mobile undercarriage, a superstructure mounted on the undercarriage so as to rotate about a vertical axis of rotation and a boom, usually a telescopic boom, mounted on the superstructure so as to pivot about a horizontal pivot axis. The boom is usually luffed up and down about the aforementioned pivot axis using one or more hydraulic luffing cylinders.

SUMMARY

Rough terrain cranes are specifically configured for use on rough terrain and have a comparatively short undercarriage with typically only two wheel axles. This equipment makes rough terrain cranes suitable for use on construction sites, particularly on uneven terrain, as well as in remote areas, such as oil and gas projects or the construction of wind turbines.

Rough-terrain cranes of this type are prone to pitching during movement due to their long telescopic boom compared to the undercarriage and their typically unsprung wheel axles with large-volume tires. This refers to movements of the front and rear of the rough terrain crane in opposite phases (i.e. the front moves downwards while the rear moves upwards and vice versa). These are small movements that are caused, for example, by the road surface (e.g. small bumps) and/or an unfavorable center of gravity (the center of gravity is not in the middle of the vehicle with a small boom angle, but far to the front) in combination with a short wheelbase and the acceleration of the rough terrain crane. Rough terrain cranes are usually operated at speeds of up to 25 km/h. Even at these comparatively low speeds, the aforementioned pitching vibrations occur. These pitching vibrations put a strain on the driver and the machine and impair the drivability of the rough terrain crane.

The object underlying the present disclosure is therefore to minimize the occurrence of pitching vibrations in generic cranes, in particular in the aforementioned rough terrain cranes.

According to the disclosure, this object is achieved by a mobile crane with the features as described herein.

Accordingly, a mobile crane, in particular a rough terrain crane, is suggested, which comprises a boom, in particular a telescopic boom, which is pivotably mounted about a horizontal pivot axis, and a hydraulic luffing cylinder by means of which the boom can be luffed up and down about the pivot axis. The crane can have one or more luffing cylinders, wherein only one luffing cylinder is referred to in the following for the sake of simplicity. The mobile crane also comprises a hydraulic control block, by means of which the luffing cylinder can be controlled or extended and retracted (and the pressure maintained). The control block can be a main control block of the crane.

Due to the high safety requirements for mobile cranes, which result from lifting loads at great heights, among other things, a first safety valve is arranged between the control block and the luffing cylinder. This is intended to prevent the boom from lowering unintentionally when lifting a load (e.g. due to leakage through the control block) and is therefore is configured to seal off a load-bearing cylinder chamber of the luffing cylinder in a locked position or to prevent hydraulic fluid from flowing back out of the load-bearing cylinder chamber. The term “load-bearing” should be understood to mean that the dead weight of the boom also represents a “load” that acts on said cylinder chamber.

The first safety valve is provided in addition to the control block, which can also be switched to a blocking position, and thus constitutes an additional safety level. The first safety valve can be a seat-tight valve, for example a lowering brake valve, which has a particularly high leak-tightness or tightness—in particular a higher tightness than conventional control blocks. The first safety valve may be controlled, for example by the crane control system, which may include instructions stored in memory thereof to carry out the actions described herein, so that it is always switched to the locked position when the boom has picked up a load and the luffing cylinder is not retracted or extended via the control block, i.e. in particular during crane operation when the crane is not moving and is supported by a support device, for example.

The aforementioned high safety requirements distinguish the luffing cylinders of such cranes from hydraulic cylinders of other construction machinery such as wheel loaders or hydraulic excavators, where additional safety valves are not mandatory in addition to the normal function of the corresponding control blocks.

Due to the first safety valve, which is arranged directly on the luffing cylinder in particular due to the high safety requirements, it is not readily possible to provide a device for hydraulic damping of the crane by the luffing cylinder or the boom during travel operation, as the first safety valve completely seals off the load-bearing cylinder chamber in the locked position and complete opening of the first safety valve during travel operation is also out of the question due to the safety requirements.

According to the disclosure, the mobile crane therefore comprises a second safety valve which is connected in series with the first safety valve, i.e. the second safety valve is located between the control block and the first safety valve. The second safety valve is configured to seal off the load-bearing cylinder chamber of the luffing cylinder in a locked position. When the first safety valve is open, the second safety valve therefore assumes the additional safety function described above and blocks the return flow of hydraulic fluid to the control block. The two safety valves are connected to each other via a hydraulic connection line. This arrangement now makes it possible to connect a damping device to the luffing cylinder without having to compromise on safety.

According to the disclosure, the mobile crane therefore comprises a hydraulic damping device by means of which pitching vibrations of the crane can be damped or canceled out by means of the boom when the crane is moved. The damping device comprises a hydraulic accumulator, which is connected to the aforementioned connection line between the two safety valves via a first valve. In a first switching position, the first valve connects the hydraulic accumulator to the connection line in a fluid-conducting manner (activated vibration damping) and disconnects the hydraulic accumulator from the connection line in a second switching position (deactivated vibration damping). In the first switching position, the boom is thus virtually supported on the hydraulic accumulator, so that compensating movements between the superstructure and the boom are possible, which counteract or dampen pitching vibrations of the crane.

Thanks to the second safety valve, the first safety valve can be fully opened, and the hydraulic accumulator of the damping device can be connected to the load-bearing cylinder chamber in a fluid-conducting manner without hydraulic fluid flowing back to the control block. In its closed position, the second safety valve separates the area comprising the load-bearing cylinder chamber, the first safety valve and the hydraulic damping device from the control block, so that said area forms a closed system. The term "sealed" is to be understood in particular in such a way that even leakage, which each control block typically has, can be excluded. This means that vibration damping can be activated during load-free movement of the crane without the hydraulic securing of the luffing cylinder or boom being removed, thus enabling the crane to be moved safely with reduced pitching vibrations. Further hydraulic components can be connected between the safety valves and the control block. It should be noted at this point that the terms "vibration damping" and "vibration absorption" are used synonymously in this document.

In one possible embodiment, the second safety valve is hydraulically controllable and has a hydraulic control port, which is connected to a control valve via a hydraulic control line. The control valve may be electrically controllable, for example by a crane control system. This can be configured so that it automatically switches the second control valve, for example together with the first safety valve (or a further control valve that hydraulically controls the first safety valve) and/or the first valve of the hydraulic damping device (or a control valve that hydraulically controls the first valve).

Alternatively or additionally, the position of the control valve can be monitored by means of a position sensor. This can be used, for example, to inform the crane control system whether the control valve is in a certain switching position and thus whether the second safety valve is in the locked position or in the open position. If an error occurs, for example a partial or complete opening of the second safety valve while the crane is moving on the construction site, the crane control system can take appropriate measures such as issuing a warning and/or stopping the crane. Of course, the second safety valve can alternatively or additionally be directly position-monitored. Alternatively or additionally, the position of the first safety valve and/or the first valve of the hydraulic damping device can be position-monitored.

In another possible embodiment, a relief device is connected in parallel to the control valve, which is configured to relieve the control line towards a tank. The relief device may connect the control line to the tank and can, for example, comprise an electrically controllable relief valve, which is switched accordingly in the event of an error. In the simplest case, the relief device can comprise a throttle device and thus permanently relieve the control line towards the tank. This ensures that in the event of an error in which the control valve cannot be properly actuated or is actuated, the control line is still relieved, and the second safety valve can securely move to the blocking position so that the luffing cylinder is secured. The control valve or the hydraulic fluid supply are configured in particular so that, when the second safety valve is open, a flow of hydraulic fluid through the throttle device is overcompensated and the second safety valve remains in the open position, for example when the luffing cylinder moves in and out.

In a further possible embodiment, it is provided that the first safety valve and/or the second safety valve is switched to the blocking position in the de-energized state. In particular, the second safety valve is in the blocking position when the control valve is not energized. As a result, the load-bearing cylinder chamber is automatically locked in the event of an error (e.g. failure of the power supply to the control valve, leak in the control line, etc.) so that the boom does not lower unintentionally.

Alternatively or additionally, the first safety valve and/or the second safety valve can be configured as a seat-tight and/or binary shut-off valve.

The first safety valve and/or the second safety valve can comprise a non-return valve which, in the closed position, blocks a return flow from the load-bearing cylinder chamber and allows a flow in the direction of the cylinder chamber. Alternatively or additionally, the first safety valve and/or the second safety valve can comprise a throttle element which, in the open position, allows a controlled, throttled flow through the valve, causing the boom to lower in a controlled manner and at a reduced speed.

In a further possible embodiment, it is provided that the first safety valve is connected directly to the load-bearing cylinder chamber. In other words, for safety reasons, there is no further valve or branch between the first safety valve and the load-bearing cylinder chamber. In particular, the first safety valve can be directly flange-mounted to the luffing cylinder. Alternatively or additionally, the first safety valve can be hydraulically connected to the load-bearing cylinder chamber via a metal pipe (and not via a hydraulic hose, for example).

In a further possible embodiment, the hydraulic damping device comprises a pressure limiting device which connects the hydraulic accumulator to a tank, in particular via a tank port of the hydraulic damping device, and limits the maximum pressure in the hydraulic accumulator to a defined limit pressure. The pressure limiting device can include a pressure cut-off or a pressure limiting valve and protects the hydraulic accumulator from overpressure. The limit pressure can be greater than 100 bar, optionally greater than 200 bar, and depends on the design of the system.

In a further possible embodiment, the hydraulic damping device has a feed port via which pressure, i.e. a feed pressure, can be applied to the hydraulic accumulator in order to keep the hydraulic accumulator at a defined pilot pressure at all times. This means that the hydraulic accumulator is always filled in a predefined manner and is ready to implement vibration damping when required. If the hydraulic accumulator were not always filled in a predefined manner, the boom would "sag" first and fill the hydraulic accumulator. A pressure limiting valve can be provided to define the pilot pressure, as described below.

Said feed port is connected to the first valve via a second valve of the hydraulic damping device. In the second switching position of the first valve, the hydraulic accumulator is connected to the second valve via the first valve, so that the hydraulic accumulator is connected to the feed pressure connection depending on the switching position of the second valve. In the first switching position of the first valve, i.e. when vibration damping is activated, the hydraulic accumulator is disconnected from the second valve.

In a further possible embodiment, it is provided that the second valve is configured as a pressure maintenance valve and is configured to be switched by the feed pressure into an open position in which the feed port is connected to the first valve via a feed pressure connection line, in particular when the feed pressure falls below a defined pilot pressure. The pilot pressure, which in particular defines the pressure at which the hydraulic accumulator is to be maintained, may be defined by a pressure limiting valve of the hydraulic damping device, which connects the feed pressure connection line between the first valve and the second valve to the tank port. In combination with the pressure limiting valve, the pressure maintenance valve therefore ensures that the hydraulic accumulator is always kept at the pilot pressure and can, for example, be configured as a proportional 3/3-way valve.

In a further possible embodiment, it is provided that the first valve of the hydraulic damping device is hydraulically switchable and has a hydraulic control port, which is connected via a hydraulic control line to a third valve of the hydraulic damping device acting as a control valve. The third valve may be electrically controllable, in particular by a crane control, which also controls the control valve of the second safety valve (and optionally also the first safety valve).

In a further possible embodiment, it is provided that the third valve connects the hydraulic control port of the first valve to the hydraulic accumulator in a first switching position. In particular, this causes the first valve to move to the first switching position so that the vibration damping is activated (provided that the first safety valve is open). In a second switching position, the third valve disconnects the control port of the first valve from the hydraulic accumulator and optionally connects it to the tank so that the first valve moves to the second switching position (vibration damping deactivated). Optionally, the third valve is pretensioned into the second switching position in the unswitched, i.e. de-energized, state. As a result, the first valve is also pretensioned into the second switching position when the third valve is in the de-energized state. This automatically deactivates the vibration damping in the event of an error.

In a further possible embodiment, the crane comprises a control system, which may be the crane control system or an additional control system that communicates with the crane control system. The control system is electrically connected to the control valve of the second safety valve and to the hydraulic damping device, in particular to the aforementioned third valve. Optionally, the first safety valve is also switched via an electrically controllable control valve, which is also controlled by the control system. The control system is configured to switch the second safety valve (via the control valve) to the blocking position and the first valve (in particular via the aforementioned third valve) to the second switching position, so that the first safety valve can be opened safely and the vibration damping can be activated. The boom is secured against sagging by the closed second safety valve.

As already described, the control system is optionally also connected to the first safety valve (or to a corresponding control valve) and is configured to open the first safety valve when the second safety valve is in the blocking position and, in particular, the hydraulic accumulator is connected to the first safety valve (i.e. the first valve is in the first switching position). However, the hydraulic accumulator does not necessarily have to be connected to the first safety valve before the latter is opened. Alternatively, the first valve of the hydraulic damping device could also be switched to the first switching position after the first safety valve has opened.

In a further possible embodiment, the control system is configured to automatically switch the second safety valve to the blocking position and the first valve to the first switching position and to open the first safety valve (activated vibration damping) when the crane is moved without an additional load being picked up by the boom (load-free travel). The control system therefore optionally automatically activates the vibration damping whenever the crane is moved without an additional load. This state can be detected, for example, via corresponding sensors on a support device of the crane (which is retracted when the crane is moved) and/or a pressure sensor on or in the luffing cylinder and/or by recording the travel speed, engine speed or any other parameters. For this purpose, the crane can, for example, comprise a first detection device for detecting the current load picked up via the boom, which is connected to the control system. In particular, the detection device can include a pressure sensor for detecting the current pressure in the load-bearing cylinder chamber.

Alternatively or additionally, the control system can be configured to automatically close the first safety valve during crane operation (i.e. in particular when the crane is supported and a load is attached to the boom—this state can be detected via corresponding sensors on the support device and/or a pressure sensor on or in the luffing cylinder) so that the vibration damping is deactivated. Optionally, the first valve of the damping device is switched to the second switching position. The second safety valve can also be closed (which further increases safety), but could also be open, as the safety function is already performed by the first safety valve.

In a further possible embodiment, it is provided that the control system is configured to activate the vibration damping (i.e. to open the first safety valve and switch the second safety valve to the blocking position and the first valve to the first switching position) only when the boom is in a defined angle range when the crane is traveling without load. This takes into account the fact that in certain boom positions (e.g. with the boom down and/or small boom angles and/or with a steeply luffed boom) no or only insignificant pitching oscillations occur. The vibration damping therefore does not need to be activated for such boom positions. In order to detect the boom position, the crane can include a second detection device for detecting the current boom angle, which is connected to the control system. A folded position of the boom could also be detected via corresponding sensors, e.g. contact switches, magnetic switches or the like, if the crane has such a folded position.

Alternatively or additionally, the control system can be configured to maintain the vibration damping during the entire travel when vibration damping is activated during a load-free journey and only reassess whether vibration damping should continue (e.g. depending on the boom angle) when the vehicle comes to a standstill again. One possible reason for this is the dynamics that prevail in the system during travel and can therefore distort an accurate load calculation.

It is conceivable that the control system could take other parameters into account as an alternative or in addition to the boom angle, for example a travel speed (e.g. the vibration damping could only be activated if a certain minimum speed is exceeded).

In a further possible embodiment, it is provided that the first valve is pretensioned into the second switching position in the unswitched state (i.e. in particular when the aforementioned third valve is not energized).

Alternatively or additionally, the first valve can have at least one transitional position between the first switching position and the second switching position, in which the hydraulic accumulator with reduced flow cross-section is connected to the connection line between the first and second safety valve. This can provide a smooth transition between the two final switching positions (activated/deactivated vibration damping) and help to avoid pressure surges.

In another possible embodiment, it is provided that the crane comprises an undercarriage with a wheeled chassis and a superstructure mounted on the undercarriage so that it can rotate, on which the boom is mounted. The wheeled chassis can have exactly two wheel axles (for example in the case of an rough terrain crane) or more than two wheel axles. The boom can be a telescopic boom with one or more inner telescopic sections. The crane can have a folding jib that can be mounted on the boom if required and can, for example, be stored on the side of the boom. In this case, the hydraulic damping device may be configured to be active and eliminate pitching vibrations even when the folding jib is mounted and the crane is otherwise traveling without load.

Optionally, the crane driver is shown on a display unit in a driver's cab of the crane when the vibration damping is activated and/or when it is deactivated.

The aforementioned hydraulic accumulator of the hydraulic damping device can be a purely hydraulic accumulator or a hydropneumatic accumulator.

BRIEF DESCRIPTION OF THE FIGURES

Further features, details and advantages of the disclosure result from the exemplary embodiments explained below with reference to the Figures. Shown are in.

DETAILED DESCRIPTION

Figure 1A:
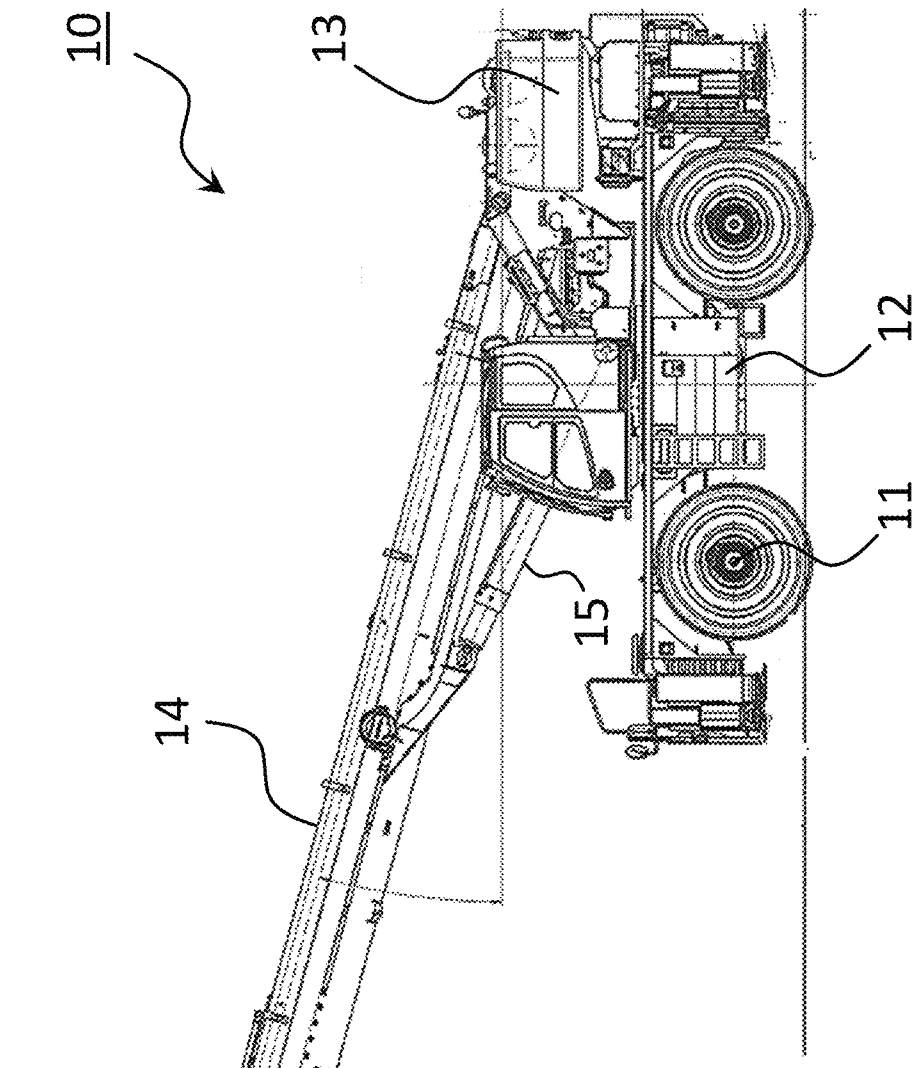
FIG. 1*a*: a side view of the mobile crane according to the disclosure according to an exemplary embodiment.
Figure 1B:
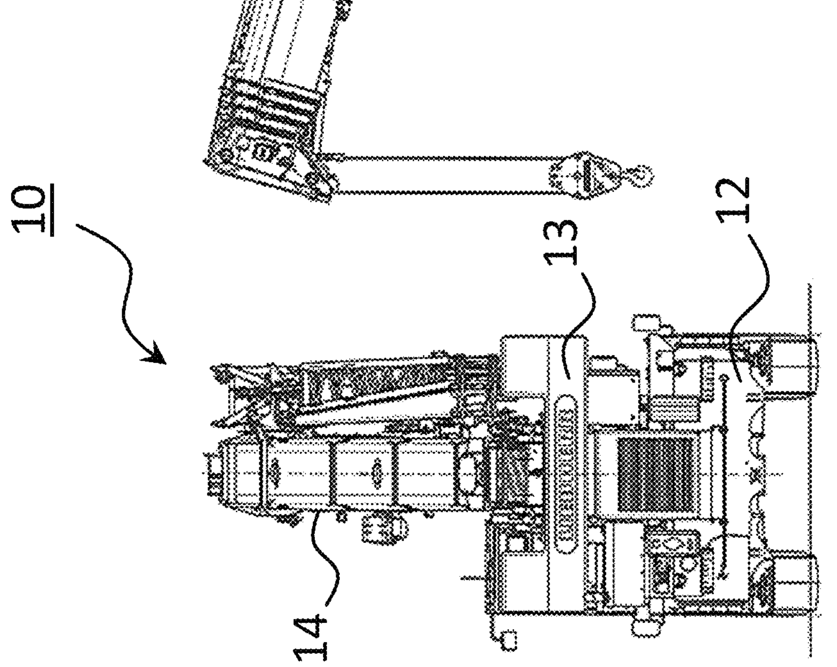
FIG. 1*b*: the crane shown in FIG. 1*a* with a view of the rear.

FIGS. 1*a* and 1*b* show an exemplary embodiment of the mobile crane 10 according to the disclosure in a side view (FIG. 1*a*) and with a view of its rear (FIG. 1*b*). In the exemplary embodiment shown here, the crane 10 is a rough terrain crane with a mobile undercarriage 12 and a superstructure 13 mounted on the undercarriage 12 so as to rotate about a vertical axis of rotation. The undercarriage 12 here has a wheeled chassis with two wheel axles 11, although more than two wheel axles 11 are also possible.

A telescopic boom 14 is mounted on the superstructure 13 so that it can pivot about a horizontal pivot axis and can be luffed up and down about the aforementioned pivot axis by means of a hydraulic luffing cylinder 15. Furthermore, a superstructure operator's cab is located on the superstructure 13, from which the crane 10 is controlled. In this exemplary embodiment, a folding jib is mounted on the side of the telescopic boom 14 (see FIG. 1*b*: can be seen there to the left of the boom 14), which can be mounted on a boom head of the telescopic boom 14 if required.

Due to its long telescopic boom 14, the particularly unsprung wheel axles 11 and the comparatively large-volume tires, the rough terrain crane 10 can be subject to pitching vibrations when it is moved-particularly off-road (but sometimes also when driving on the road). In order to eliminate or dampen these pitching vibrations, a hydraulic damping device 30 is provided according to the disclosure, which comprises a suitably tuned hydraulic accumulator 34, which can be hydraulically connected to a piston chamber or a load-bearing cylinder chamber 15*a* of the luffing cylinder 15 as required, so that the boom 14 is supported on the hydraulic accumulator 34 during movement. This enables compensating movements between the vehicle frame and boom 14, which significantly reduce pitching vibrations.

Figure 2:
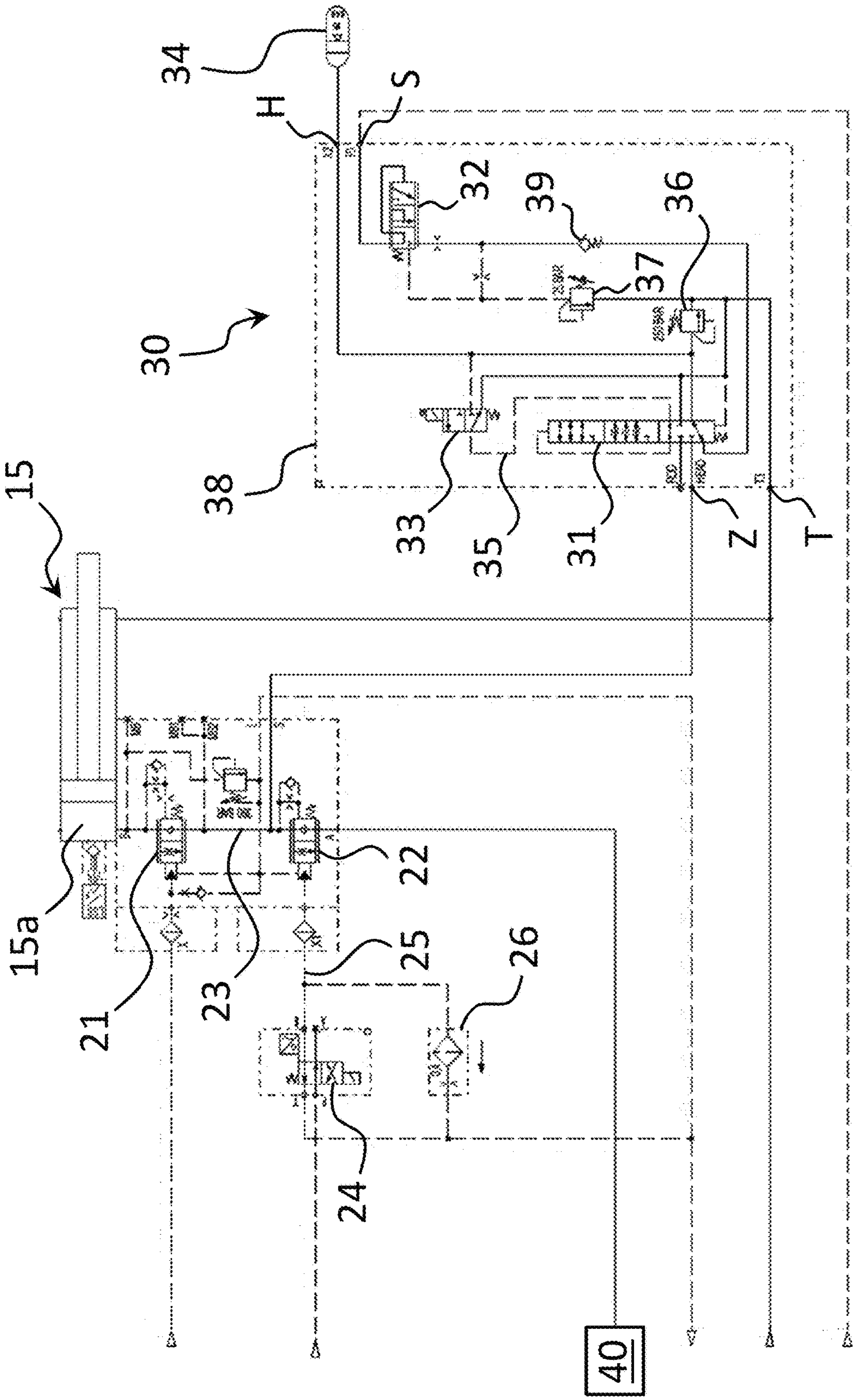
FIG. 2: a schematic representation of the hydraulic system supplying the luffing cylinder with safety valves and damping device.
Figure 3:
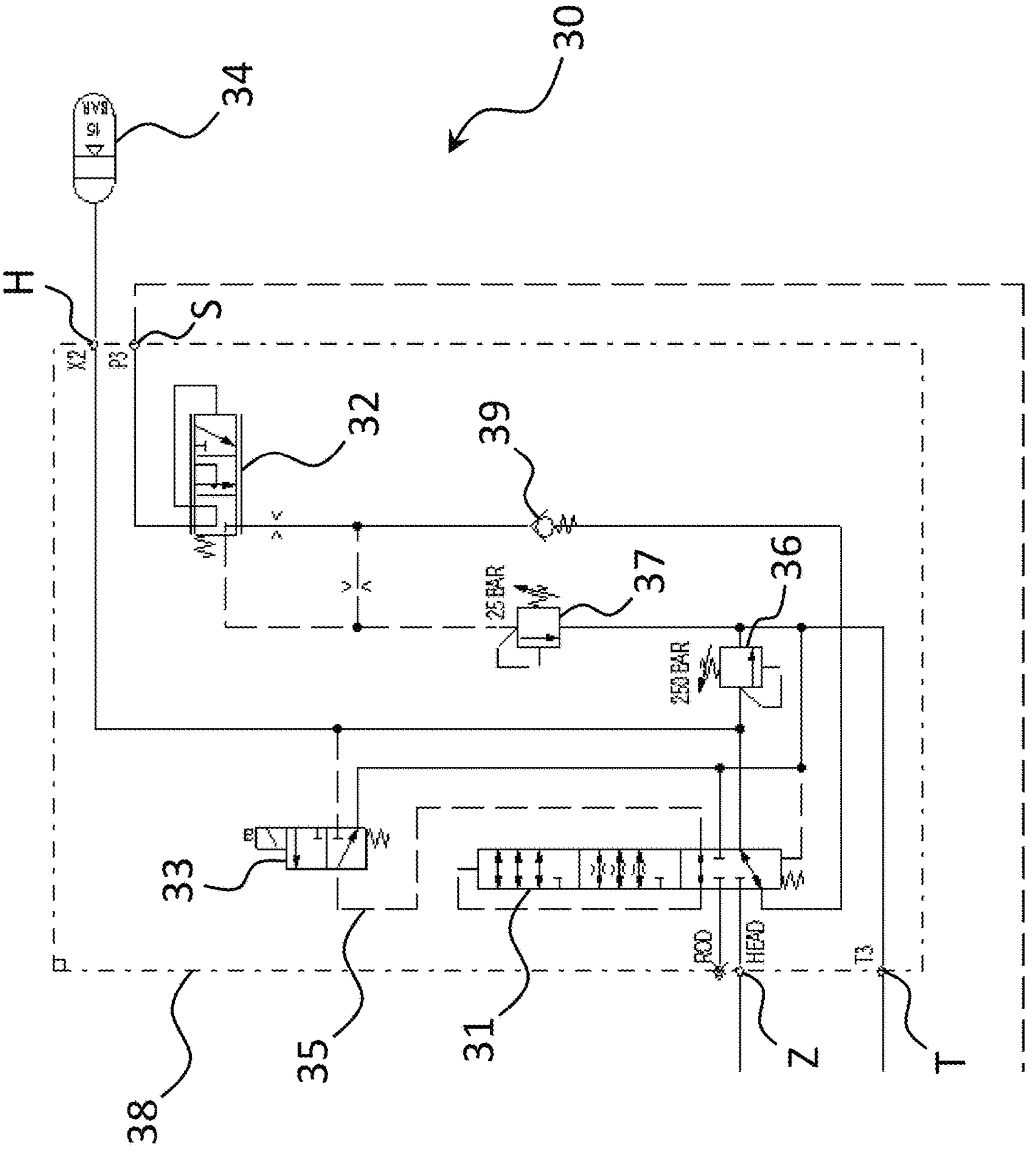
FIG. 3: an enlarged view of the damping device as shown in FIG. 2.

FIG. 2 shows an exemplary embodiment of the hydraulic damping device 30 and the hydraulic system of the crane 10 connecting the damping device 30 to the luffing cylinder 15. FIG. 3 shows an enlarged view of the circuit diagram of the damping device 30.

The luffing cylinder 15 comprises a piston and a piston rod emerging from one side of the cylinder housing, which is connected to the boom 14 (or a hinge section). The piston chamber 15*a* represents the load-bearing cylinder chamber of the luffing cylinder 15, the pressure of which counteracts the dead weight of the boom 14 including any additional equipment (e.g. the folding jib shown) as well as the weight of any load lifted via the boom 14.

Extension and retraction of the luffing cylinder 15 occurs via a control block 40, which is in particular the main control block of the crane 10. This is only shown schematically as a box in FIG. 2. Due to the high safety requirements for the luffing cylinder 15 in this type of rough terrain crane 10, a first safety valve 21 is connected directly to the load-bearing cylinder chamber 15*a* and in particular flanged directly to the luffing cylinder 15, without any further branches. In the exemplary embodiment shown here, the first safety valve 21 is a seat-tight lowering brake valve with two switching positions. In a blocking position (the position shown in FIG. 1), the first safety valve 21 blocks a return flow of hydraulic fluid from the load-bearing cylinder chamber 15*a* to the control block 40, i.e. the load-bearing cylinder chamber 15*a* is sealed off. The first safety valve 21 has such a high degree of seat tightness that leakage, as is usually the case with any control block, for example, is largely excluded. This prevents the boom 14 from being lowered unintentionally. In an open position, the first safety valve 21 allows a flow of hydraulic fluid between the luffing cylinder 15 and the control block 40. This flow can be deliberately reduced, as indicated by a throttle symbol in FIG. 2, in order to achieve a slow lowering of the boom, although this throttling of the flow is not mandatory.

The first safety valve 21 is controlled hydraulically via a control valve not shown, which in turn is actuated electrically by a control system, which may be the crane control system. As indicated in FIG. 2, the first safety valve 21 can comprise a non-return valve which, in the blocking position, blocks a flow from the luffing cylinder 15 to the control block 40 and allows a flow in the opposite direction.

In order to be able to connect the hydraulic damping device 30 or its hydraulic accumulator 34 to the load-bearing cylinder chamber 15*a* without reducing the safety level of the crane 10 (because this requires a direct connection between hydraulic accumulator 34 and cylinder chamber 15*a*, i.e. an open first safety valve 21), a second safety valve 22 is connected in series between control block 40 and first safety valve 21 in accordance with the disclosure. The second safety valve 22 fulfills the same safety requirements as the first safety valve 21 and can, in particular, also be configured as a seat-tight lowering brake valve with two switching positions, possibly including a non-return valve and/or throttle.

The second safety valve 22 is hydraulically controlled by the control valve 24 shown in FIG. 2, wherein the control valve 24 is connected to a control port of the second safety valve 22 via a hydraulic control line 25. The control valve 24 can be actuated electrically and is controlled via the aforementioned control system, which thus indirectly opens or closes the second safety valve 22 accordingly. The control valve 24 can be configured as a 4/2-way valve. It may comprise a control pressure port and a tank port, which are connected to the control line 25 depending on the switching position.

In the exemplary embodiment shown, the two safety valves 21, 22 are configured so that they are each in the locked position when not actuated (i.e. the corresponding control valves are de-energized) (see FIG. 2). In the event of an error (e.g. in the event of a power supply failure), the load-bearing cylinder chamber 15*a* is therefore always locked and the boom 14 is secured. In order to further increase the reliability, an additional relief device 26 can be provided, as shown in FIG. 2, for example. In the exemplary embodiment shown, the relief device 26 comprises a throttle and connects the control line 25 to a hydraulic tank of the crane 10, so that the control line 25 is hydraulically relieved and the second safety valve 22 can always close safely in the event of an error. Optionally, in the de-energized state (the position shown in FIG. 2), the control valve 24 is in a switching position in which the control line 25 is relieved towards the tank.

In addition to the aforementioned hydraulic accumulator 34, the hydraulic damping device 30 comprises a first valve 31 which, in a first switching position, hydraulically connects the hydraulic accumulator 34 to the connection line 23 connecting the two safety valves 21, 22 to one another and, in a second switching position (the position shown in FIG. 2), disconnects the hydraulic accumulator 34 from the connection line 23 or the safety valves 21, 22. In the exemplary embodiment shown here, the first valve 31 is configured as a main slide valve and, in addition to a first switching position (complete connection of the hydraulic accumulator 34) and a second switching position (complete disconnection of the hydraulic accumulator 34), can have one or more transitional positions with reduced or throttled cross-sections in order to achieve a smooth transition between activated and deactivated vibration damping and to avoid pressure surges. FIGS. 2 and 3 show a transitional position with several throttles and nozzles.

In the exemplary embodiment shown here, the hydraulic damping device 30 comprises a control block 38, in which, in addition to the aforementioned first valve 31, a second valve 32 and a third valve 33 are also integrated, the function of which will be discussed later. The hydraulic accumulator 34 is connected to the control block 38 and therein to the first valve 31 via a port H, wherein alternatively the hydraulic accumulator 34 can also be integrated into an assembly together with the aforementioned components. Alternatively, the aforementioned valves can be arranged in different assemblies or not in a common control block 38

The control block 38 has a tank port T, via which it is connected to a hydraulic tank. A pressure cut-off means 36 connects the hydraulic accumulator 34 to the tank port T and thus protects the hydraulic accumulator 34 from overpressure (in the exemplary embodiment, the limit pressure is 250 bar, although other values greater/less than 250 bar are of course also conceivable).

The hydraulic damping device 30 comprises a second valve 32, which in the exemplary embodiment shown here is configured as a hydraulically actuated, proportional 3/3-way valve. The second valve 32 acts as a pressure maintenance valve and is opened by the feed pressure applied to a feed port S of the control block 38. The output of the second valve 32 is connected to the first valve 31 via a feed pressure connection line, in which a non-return valve 39 is arranged, whereby the non-return valve 39 blocks a flow of hydraulic fluid from the first valve 31 to the second valve 32. The outlet of the second valve 32 is also connected to the tank port T via a pressure limiting valve 37, which always keeps the pressure for the hydraulic accumulator 34 (pilot pressure) provided via the feed port S at a defined value (in the present case 25 bar, although other values of more or less than 25 bar are also conceivable here-depending on the design of the system or the luffing cylinder 15 and the hydraulic accumulator 34). This means that the hydraulic accumulator 34 is always filled in a predefined manner and is ready to implement vibration damping when required. If it were not filled in a predefined manner, the boom 14 would “sag” first and fill the hydraulic accumulator 34.

The first valve 31 is controlled hydraulically via a third valve 33, which in turn is actuated electrically by the control system. The third valve 33 connects the hydraulic accumulator 34 to the end face of the first valve 31 via a control line 35. The control pressure prevailing in the control line 35 (this corresponds to the pilot pressure in the hydraulic accumulator 34 when the third valve 33 is open) presses the first valve 31 into the first switching position. The third valve 33 is configured in such a way that in the de-energized state (see FIG. 2) it is in a switching position in which the control line 35 is connected to the tank port T, whereby the first valve 31 is in the second switching position (vibration damping deactivated, see FIG. 2). If the third valve 33 is energized, the control line 35 is connected to the hydraulic accumulator 34 and the first valve 31 is moved to the first switching position (vibration damping activated). In the exemplary embodiment shown, the control line 35 runs through the first valve 31, although this does not necessarily have to be the case. The third valve 33 can be configured as a 3/2-way valve.

In the second switching position of the first valve 31 shown in FIG. 2, the hydraulic accumulator 34 is disconnected from the connection line 23 between the two safety valves 21, 22 and the hydraulic accumulator 34 is connected to the second valve 32 and, if the latter is open, to the feed port S.

In the first switching position of the first valve 31, the hydraulic accumulator 34 is connected to the connection line 23 via the connection Z and disconnected from the feed pressure connection line and the second valve 32 or the feed port S. Vibration damping is activated and the boom 14 can vibrate in the opposite direction to the pitching vibrations and cancel or reduce them.

Due to the second safety valve 22 provided in accordance with the disclosure, it is possible to connect the hydraulic damping device 30 directly to the load-bearing cylinder chamber 15*a* via the open first safety valve 21. The aforementioned cylinder chamber 15*a* and the hydraulic damping device 30 continue to form a closed system when the second safety valve 22 is closed. When vibration damping is activated, the first safety valve 21 is fully open in particular, as the hydraulic accumulator 34 must be connected directly to the load-bearing cylinder chamber 15*a* without interfering resistances for proper damping.

The situation remains unchanged for crane operation compared to the prior art: the first safety valve 21 bears the load (i.e. blocks the load-bearing cylinder chamber 15*a*). The vibration damping is deactivated and the first valve 31 may beswitched to the second switching position. The hydraulic accumulator 34 is filled with the pilot pressure via the feed port S and the second valve 32. In particular, the second safety valve 22 is fully open and therefore has no effect. The connection Z is blocked via the first valve 31. The “luffing boom” crane function is available as usual.

In driving mode with vibration damping activated, the second safety valve 22 is now closed and the first safety valve 21 is fully opened in order to connect the hydraulic accumulator 34 fluidically to the load-bearing cylinder chamber 15*a* of the luffing cylinder 15. The vibration damping can now be activated by switching the first valve 31 to the first switching position. The control valve 24 may be position-monitored in order to detect defects.

The second safety valve 22 is seat-tight so that the fluid volume remains in the closed system of hydraulic accumulator 34 and cylinder piston side. In this closed-off hydraulic volume, the decoupled telescopic boom 14 can now luff in a damped manner and act as a vibration absorber. It counteracts the pitching vibrations of the rough terrain crane 10 with its counter-rotating vibration behavior and largely cancels them out. The usual lifting of loads is not possible in this state.

Vibration damping can be activated automatically by the control system while the crane 10 is traveling without a load. The activity of the damping may be shown to the driver via a display in the crane cab.

When moving, the rough terrain crane 10 can carry a folding jib (see FIG. 1*b*) located next to the telescopic boom 14 or installed on the telescopic boom 14 in the working position. In addition, hook blocks of different weights can be installed on the crane 10. In principle, the crane operator is permitted to move the rough terrain crane 10 with a load. However, if vibration damping is activated, the crane may only be moved without a load. The load weighing may be realized via the luffing cylinder 15 and includes, for example, a pressure sensor that detects the pressure prevailing in the load-bearing cylinder chamber 15*a* and makes it available to the control system. The additional components mentioned (hook block, folding jib) also act on the luffing cylinder 15 via their own weight.

In an optional embodiment, the mobile crane 10 comprises a load moment limiter (LMB), which compares a detected current load capacity with stored and/or dynamically calculated limit values and may take a suitable measure, such as issuing a visual and/or acoustic warning and/or intervening in the control system (e.g. limiting or stopping a current crane movement), if the limit values are exceeded (or are about to be exceeded). An active LMB is not necessarily required to move the rough terrain crane 10—the crane operator can also move the rough terrain crane 10 without an LMB. For this reason, load weighing by the LMB cannot be used to enable vibration damping. In particular, the setup status cannot be determined precisely.

It is possible for the control system to enable vibration damping depending on the pressure in the luffing cylinder 15 (or in the load-bearing cylinder chamber 15*a*) and the angle of the telescopic boom 14 to the horizontal. A threshold value for the pressure can be used as a control variable for switching on the vibration damping. The dependency on the installed accessories (e.g. folding jib) must be taken into account for the threshold value. The threshold value can be calculated from the pressure in the luffing cylinder 15 and the angle of the telescopic boom 14. In one exemplary embodiment, the rough terrain crane 10 can also be moved with the heaviest hook block and the folding jib with active vibration damping.

The decision as to whether vibration damping is enabled (the control system may enable the function independently) can be made before starting the journey and maintained for the entire journey. A new determination as to whether vibration damping may continue to be enabled or not is made when the rough terrain crane 10 comes to a standstill again.

If vibration damping is enabled, the second safety valve 22 is closed. The switching state of the second safety valve 22 may be monitored. Monitoring can be indirect. If the switching position is “closed” (locked position), the first safety valve 21 is opened and vibration damping is enabled via the first valve 31. If the vibration damping is not enabled, the second safety valve 22 and the first safety valve 21 remain closed, in particular, as long as no luffing movement of the telescopic boom 14 is performed. By adding the second safety valve 22 between the first safety valve 21 and control block 40 (for the luffing of the telescopic boom 14), the control valve 24 must also be energized during luffing. If the control valve 24 is not energized, it is not possible to luff the telescopic boom 14.

One or more of the various hydraulic lines terminating on the left in FIG. 2 may also be connected to the control block 40. In FIG. 2, for the sake of simplicity and for illustrative purposes, the box 40 is only connected to the hydraulic line in which the first and second safety valves 21, 22 are arranged. However, this should not be understood as limiting.

LIST OF REFERENCE CHARACTERS

- 10 Mobile crane
- 11 Wheel axle
- 12 Undercarriage
- 13 Superstructure
- 14 Boom
- 15 Luffing cylinder
- 15*a* Load-bearing cylinder chamber
- 21 First safety valve
- 22 Second safety valve
- 23 Connection line
- 24 Control valve
- 25 Control line
- 26 Relief device
- 30 Hydraulic damping device
- 31 First valve
- 32 Second valve
- 33 Third valve
- 34 Hydraulic accumulator
- 35 Control line
- 36 Pressure limiting device
- 37 Pressure limiting valve
- 38 Control block
- 39 Non-return valve
- 40 Control block
- H Connection hydraulic accumulator
- S Feed port
- T Tank port
- Z Connection luffing cylinder

The invention claimed is:

1. Mobile crane, comprising a boom which is mounted in a manner pivotable about a horizontal pivot axis, a hydraulic luffing cylinder, by means of which the boom can be luffed up and down about the pivot axis, a hydraulic control block for controlling the luffing cylinder, a first safety valve, which is connected between the control block and the luffing cylinder and is configured to seal off a load-bearing cylinder chamber of the luffing cylinder in a blocking position, and a second safety valve, which is connected in series between the first safety valve and the control block and is configured to seal off the load-bearing cylinder chamber of the luffing cylinder in the blocking position, and a hydraulic damping device, via which pitching vibrations of the crane can be damped by the boom when the crane is moved, and which comprises a hydraulic accumulator and a first valve, wherein the first valve connects the hydraulic accumulator to a connection line between the first and second safety valves in a first switching position and disconnects the hydraulic accumulator from the connection line in a second switching position, wherein the second safety valve is hydraulically-controllable and comprises a control port which is connected to a control valve via a hydraulic control line, wherein the control valve is electrically controllable and/or position-monitored by means of a position sensor.

2. Mobile crane according to claim 1, wherein the first safety valve and/or the second safety valve comprise a non-return valve that blocks a return flow from the load-bearing cylinder chamber to the first safety valve and/or the second safety valve, respectively.

3. Mobile crane according to claim 1, wherein a relief device is connected in parallel to the control valve, which is configured to relieve the control line towards a tank.

4. Mobile crane according to claim 1, wherein the first and/or the second safety valve is switched to the blocking position in an unswitched state and/or is configured as a seat-tight, binary blocking valve.

5. Mobile crane according to claim 1, wherein the first safety valve is directly connected to the load-bearing cylinder chamber.

6. Mobile crane according to claim 1, wherein the hydraulic damping device comprises a pressure limiting device which connects the hydraulic accumulator to a tank and limits a maximum pressure in the hydraulic accumulator to a limit pressure.

7. Mobile crane according to claim 1, wherein the hydraulic damping device comprises a feed port via which the hydraulic accumulator can be applied with pressure, wherein the feed port is connected to the first valve via a second valve, wherein the first valve connects the hydraulic accumulator to the second valve in the second switching position and disconnects it from the second valve in the first switching position.

8. Mobile crane according to claim 7, wherein the second valve is configured as a pressure maintenance valve, and is configured to be switched by a feed pressure to an opened position in which the feed port is connected to the first valve.

9. Mobile crane according to claim 8, wherein the first valve is hydraulically switchable and comprises a control port which is connected via a control line to a third valve of the hydraulic damping device.

10. Mobile crane according to claim 9, wherein the third valve connects the control port of the first valve to the hydraulic accumulator in a first switching position and disconnects it from the hydraulic accumulator in a second switching position, wherein the third valve is pretensioned into the second switching position in an unswitched state.

11. Mobile crane according to claim 1, comprising a control system which is electrically connected to the control valve and the hydraulic damping device and is configured to switch the second safety valve to the blocking position and the first valve to the second switching position, wherein the control system is also connected to the first safety valve and is configured to open the first safety valve when the second safety valve is in the blocking position and the hydraulic accumulator is connected to the first safety valve.

12. Mobile crane according to claim 11, wherein the control system is configured to automatically switch the second safety valve to the blocking position and the first valve to the first switching position and to open the first safety valve when the crane is moved without a load picked up via the boom, wherein the crane comprises a first detection device for detecting a current load picked up via the boom, which is connected to the control system, wherein the detection device comprises a pressure sensor for detecting a current pressure in the load-bearing cylinder chamber.

13. Mobile crane according to claim 12, wherein the control system is configured to open the first safety valve and to switch the second safety valve into the blocking position and the first valve into the first switching position only when the boom is in a defined angular range during load-free travel of the crane, wherein the crane comprises a second detection device for detecting a current boom angle, which is connected to the control system.

14. Mobile crane according to claim 1, wherein the first valve is pretensioned into the second switching position in an unswitched state and/or wherein the first valve has at least one transitional position between the first switching position and the second switching position, in which the hydraulic accumulator with reduced flow cross-section is connected to the connection line between the first and second safety valve.

15. Mobile crane according to claim 1, comprising an undercarriage with a wheeled chassis and a superstructure which is rotatably mounted on the undercarriage and on which the boom is mounted, wherein the boom is configured as a telescopic boom.

16. Mobile crane according to claim 3, wherein the relief device comprises a throttle device and permanently relieves the control line towards the tank.

17. Mobile crane according to claim 4, wherein the first safety valve is directly flange-mounted to the luffing cylinder and/or hydraulically connected to the load-bearing cylinder chamber via a metal pipe.

18. Mobile crane according to claim 8, wherein a pilot pressure is defined by a pressure limiting valve of the hydraulic damping device, which connects a feed pressure connection line between the first valve and the second valve to a tank port.

19. Mobile crane, comprising a boom which is mounted in a manner pivotable about a horizontal pivot axis, a hydraulic luffing cylinder, by means of which the boom can be luffed up and down about the pivot axis, a hydraulic control block for controlling the luffing cylinder, a first safety valve, which is connected between the control block and the luffing cylinder and is configured to seal off a load-bearing cylinder chamber of the luffing cylinder in a blocking position, and a second safety valve, which is connected in series between the first safety valve and the control block and is configured to seal off the load-bearing cylinder chamber of the luffing cylinder in the blocking position, and a hydraulic damping device, via which pitching vibrations of the crane can be damped by the boom when the crane is moved, and which comprises a hydraulic accumulator and a first valve, wherein the first valve connects the hydraulic accumulator to a connection line between the first and second safety valves in a first switching position and disconnects the hydraulic accumulator from the connection line in a second switching position, wherein a relief device is connected in parallel to a control valve coupled to a control port of the second safety valve, which is configured to relieve a hydraulic control line towards a tank.

* * * * *